United States Patent [19]
Mori

[11] Patent Number: 5,145,464
[45] Date of Patent: Sep. 8, 1992

[54] CENTRIFUGAL CVT OIL PRESSURE CONTROL DEVICE

[75] Inventor: Masanori Mori, Chiryu, Japan

[73] Assignee: Aisin Seiki Kabushiki Kaisha, Kariya, Japan

[21] Appl. No.: 639,539

[22] Filed: Jan. 10, 1991

[30] Foreign Application Priority Data

Jan. 10, 1990 [JP] Japan ................................ 2-1590

[51] Int. Cl.$^5$ ............................................. F16H 61/00
[52] U.S. Cl. ........................................ 474/16; 474/28
[58] Field of Search ................ 475/208, 210; 474/16, 474/28

[56] References Cited

U.S. PATENT DOCUMENTS

| | | | |
|---|---|---|---|
| 3,782,213 | 1/1974 | Rattunde | 474/16 X |
| 4,543,852 | 10/1985 | Svab et al. | 475/210 |
| 4,575,364 | 3/1986 | Lamers | 464/28 X |

FOREIGN PATENT DOCUMENTS 329205  8/1989  European Pat. Off. .............. 474/16

Primary Examiner—Ramon S. Britts
Assistant Examiner—Roger J. Schoeppel
Attorney, Agent, or Firm—Burns, Doane, Swecker & Mathis

[57] ABSTRACT

A centrifugal oil pressure control arrangement for a continuously variable transmission includes an oil pressure chamber connected to a sheave member, a centrifugal oil pressure correction chamber connected to the opposite side of the oil pressure chamber with respect to the sheave member, and a cylinder connected to the sheave. A piston is disposed fixedly in the cylinder and defines the oil pressure chamber and the centrifugal oil pressure chamber by the piston. A first opening formed on the piston and the oil pressure chamber is communicated with the centrifugal oil pressure chamber by the first opening. The centrifugal oil pressure control arrangement includes the cylinder having a main cylinder and a sub-cylinder. The main cylinder is connected to the sheave and slidably moved on the main cylinder. The sub-cylinder is fixedly connected to the shaft and has a second opening communicated between the centrifugal oil pressure chamber and a casing. The second opening is radially located to become equal to or a slightly smaller than the inner radius of the sheave.

5 Claims, 4 Drawing Sheets the
CENTRIFUGAL CVT OIL PRESSURE CONTROL DEVICE

BACKGROUND OF THE INVENTION

1. Field of the Invention

This invention relates to a centrifugal oil pressure control device, and more particularly to a centrifugal oil pressure control device for a continuously variable transmission which includes a centrifugal oil pressure correction chamber so as to prevent centrifugal oil pressure from acting on the sheaves.

2. Description of the Related Art

A V-belt type continuously variable transmission which is used in an automotive vehicle is well known. This conventional device includes a V-belt, an input sheave, an output sheave and an oil pressure chamber. The oil pressure chamber is provided with each sheave, and oil pressure is supplied thereto or released therefrom. The V-belt is rotatably arranged between the input sheave and the output sheave, and the radius of the V-belt is varied to become a certain value by means of controlling oil pressure of the oil pressure chamber. As a result, shift changes are carried out in a continuously variable step.

In this case, the oil pressure chamber is rotated together with the sheave. Therefore, a centrifugal oil pressure occurs in the oil pressure chamber. The centrifugal oil pressure radially acts on the sheave and is outwardly, increased, so that the depression or movement of the sheave corresponds to an oil pressure of the oil pressure chamber. Thus, a desired shift change can not be exactly carried out. In order to avoid this problem, various types of devices having a centrifugal oil pressure correction chamber are proposed. For instance, Japanese Laid Open Patent Publications No. 59-99157 and 60-164068 are such examples.

In Japanese Laid Open Patent Publication No. 59-99157, as shown in FIG. 4, an oil pressure chamber 2 is provided with a movable sheave 1b. Moreover, a centrifugal oil pressure correction chamber 3 is provided at the opposite side of the oil pressure chamber 2 with respect to the movable sheave 1b and is filled with oil. Therefore, a centrifugal oil pressure is provided in the centrifugal oil pressure correction chamber 3 and acts in an opposite direction of depression or movement of the movable sheave 1b. As a result, the centrifugal oil pressure acting on the movable sheave 1b is decreased.

On the other hand, Japanese Laid Open Patent Publication No. 60-164068, in as shown in FIG. 5, an oil pressure correction chamber 13 is provided at the opposite side of an oil pressure chamber 12 with respect to a movable sheave 11b so as to avoid the same problem.

However, in reference to FIG. 4, a cylinder 4 of the oil pressure chamber 2 is axially extended and is movably provided on a piston 5. The centrifugal oil pressure chamber 3 is defined by the cylinder 4 and the piston 5. Therefore, the radial oil pressure area of the centrifugal oil pressure correction chamber 3 is smaller than that of the movable sheave 1b. Thereby, the remaining centrifugal oil pressure acts on the movable sheave 1b, so that a desired shift change can not be exactly carried out.

Also, in reference to FIG. 5, a cylinder 14 of the oil pressure chamber 12 is axially extended to a shaft 16 and is slidably movable on the shaft 16. The centrifugal oil pressure chamber 13 is defined by the cylinder 14 and a piston 15 which is disposed in the cylinder 14. Therefore, the radial oil pressure area of the centrifugal oil pressure correction chamber 13 is equal to that of the oil pressure chamber 12. As a result, the centrifugal oil pressure acting on the movable sheave 11b almost becomes naught. However, the axial movement of the cylinder 14 is required. Thus, a large axial space is required.

SUMMARY OF THE PRESENT INVENTION

It is an object of the invention to provide an improved centrifugal oil pressure control device for continuously variable transmission which obviates the above-described drawbacks.

In order to accomplish the object, a centrifugal oil pressure control device for a continuously variable transmission comprises a first sheave fixedly connected to a shaft, a second sheave slidably connected to the shaft and rotated together with the shaft, a power transmitting member between the first and the second sheaves, an oil pressure chamber connected to the second sheave, a centrifugal oil pressure correction chamber connected in the opposite side of the oil pressure chamber with respect to the second sheave, a cylinder connected to the second sheave, a piston disposed fixedly in the cylinder and defining the oil pressure chamber and the centrifugal oil pressure chamber thereby, a first opening formed on the piston and the oil pressure chamber is communicated with the centrifugal oil pressure chamber by the first hole, and a centrifugal oil pressure control means includes the cylinder having a main cylinder and a sub-cylinder. The main cylinder is connected to the second sheave and slidably moved on the main cylinder. The sub-cylinder is connected to the shaft and has a second opening communicated between the centrifugal oil pressure chamber and a casing. The second is radially located to become equal to or a slightly smaller than inner radius of the second sheave.

DETAILED DESCRIPTION OF PREFERRED EMBODIMENTS OF THE INVENTION

Figure 1:
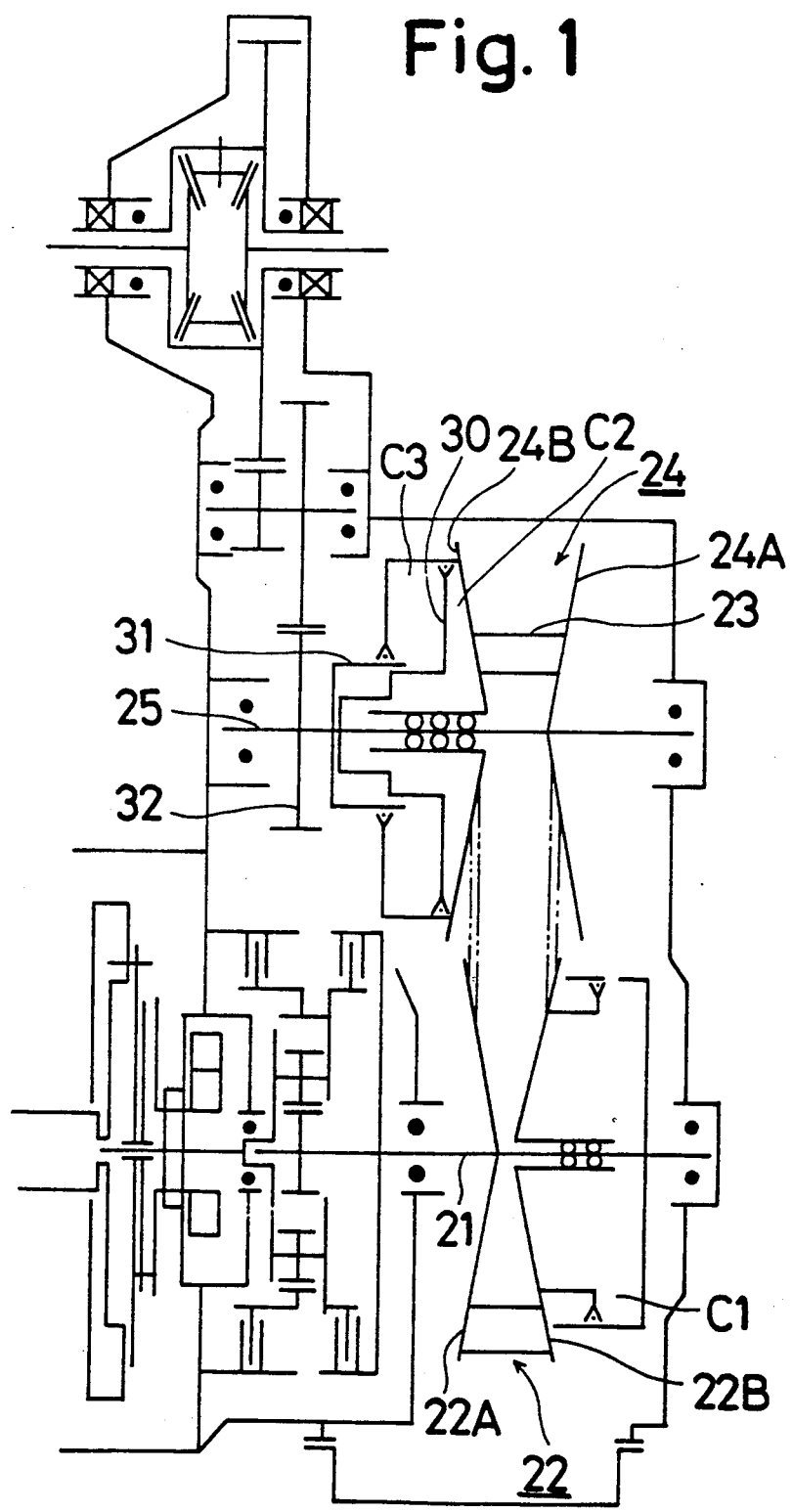
FIG. 1 is a schematic representation of a centrifugal oil pressure control device for continuously variable transmission of the invention.

Referring to FIG. 1, power is inputted from an engine (not shown) to an input sheave 22 via an input shaft 21. Moreover, power is transmitted to an output sheave 24 via a V-belt 23 which is arranged between the input sheave 22 and the output sheave 24, and is outputted to an output shaft 25 therefrom. Thus, power is transmitted from the input shaft 21 to the output shaft 25 by means of a gear ratio which is determined by each radius of the V-belt 23 of the input sheave 22 end of the output sheave 24.

Each radius of the V-belt 23 is changed by the axial movement of a movable sheave 22B of the input sheave 22 and/or a movable sheave 24B of the output sheave 24. The movable sheave 22B is axially moved by controlling oil pressure in an oil pressure chamber C1. The movable sheave 24B is also axially moved by controlling oil pressure in an oil pressure chamber C2.

Figure 2:
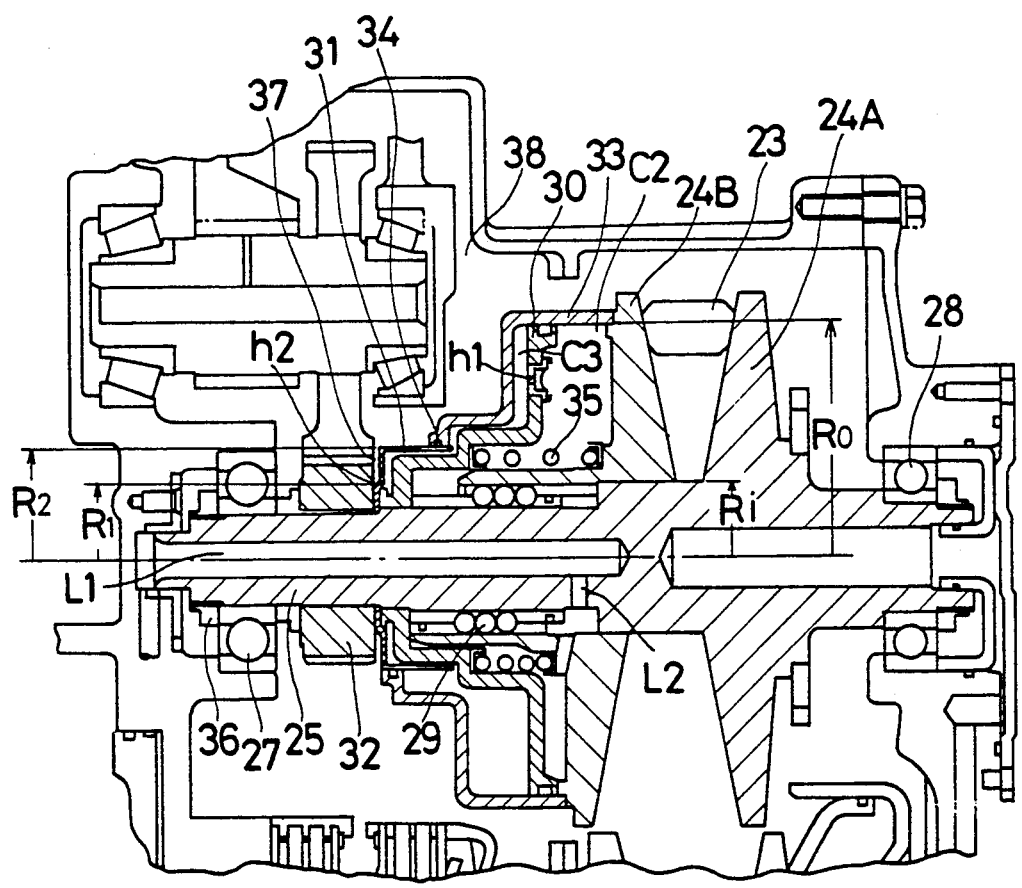
FIG. 2 shows a partially cross sectional view illustrated an embodiment of the invention.

Referring to FIG. 2, the output sheave 24 includes a fixed sheave 24A and the movable sheave 24B. The fixed sheave 24A is integrally formed with the output shaft 25 which is rotatably supported by ball bearings 27 and 28. Each bearing 27 and 28 is located at both ends of the output sheave 24. The movable sheave 24B is axially movable by a ball-spline 29 which is disposed between the output shaft 25 and the sheave 24B and is rotatable with the output shaft 25. The fixed and movable sheaves 24A and 24B confront each other and hold the V-belt 23 therebetween.

A piston 30 is snugly fixed to the output shaft 25. One end of a sub-cylinder 31 is fixedly held between one end of the piston 30 and an output gear 32 which is engaged with the output shaft 25. Therefore, the sub-cylinder 31 and the output shaft 25 rotate with each other.

One end of a main cylinder 33 is fixedly connected to an outer peripheral portion of a side wall of the movable sheave 24B. The other end of the main cylinder 33 is movably attached on the outer surface of the sub-cylinder 31. Thereby, a large axial space for the main-cylinder 33 is not required. Also, the oil pressure chamber C2 is defined between the piston 30 and the outer portion of the movable sheave 24B. A centrifugal oil pressure correction chamber C3 is defined between the piston 30 and cylinders 31 and 33. The seal of the oil pressure chamber C2 and the centrifugal oil pressure correction chamber C3 is maintained by an O-ring 34.

A spring 35 is interposed between the movable sheave 24B and the piston 30 and the movable sheave 24B is biased toward the fixed sheave 24A by the spring 35. A small opening h1 is formed on the piston 30 so as to communicate between the oil pressure chamber C2 and the oil pressure correction chamber C3. A clearance 37 is provided between the output gear 32 and the side wall of the sub-cylinder 31. Another small opening h2 is formed on the side wall of the sub-cylinder 31 so as to communicate between the oil pressure correction chamber C3 and an inner portion 38 of the transmission casing. The size of the small opening h1 is set to be smaller than that of the small opening h2. The oil pressure is supplied from oil lines L1 and L2 formed in the output shaft 25 to the oil pressure chamber C2. The sub-cylinder 31, the output gear 32 and the ball bearing 27 are assembled, without providing an axial clearance, by a nut 36.

The operation of the above construction of the invention is described below:

When oil pressure is released from the oil pressure chamber C1 and is supplied into the oil pressure chamber C2 via oil lines L1 and L2 as shown in FIG. 2, the movable sheave 24B is urged in the direction of the fixed sheave 24A. Thereby, the radius of the V-belt 23 is radially moved. As a result, the gear ratio of the transmission is increased. (On the other hand, when oil pressure is supplied into the oil pressure chamber C1 and is released from the oil pressure chamber C2 via oil lines L1 and L2, the gear ratio of the transmission is decreased.

The oil pressure transmitted into the oil pressure chamber C2 is supplied into the centrifugal oil pressure correction chamber C3 through the small opening h1. In this case, since the size of the small opening h1 is smaller then that of the small opening h2, the movable sheave 24B can be urged by the pressure difference between the oil pressure of the oil pressure chamber C2 and the centrifugal oil pressure correction chamber C3. Thereby, the V-belt 23 can be held between the fixed and movable sheaves 24A and 24B. If excess oil pressure is supplied into the oil pressure chamber C2, the excess oil pressure is released from the small opening h2 via the small opening h1. Thus, oil pressure is prevented from building up in the oil pressure correction chamber C3.

In this case, when the oil pressure chamber C2 and the oil pressure correction chamber C3 are rotated together with the output shaft 25, the centrifugal oil pressure is generated in the oil pressure chamber C2. As a result, the depression force F acting on the movable sheave 24B is represented by the following formula:

$$F = Fpo + Fsp + Fpc$$

(Fpo: force exerted by the oil pressure in the oil pressure chamber C2, Fsp: urging force of the spring 35, Fpc: force exerted by the centrifugal oil pressure in the oil pressure chamber C3)

Fpc is determined by the outer and inner radiuses $R_0$ and $R_i$ of the piston 30 and the rotational speed N of the same. That is to say, Fpc is represented by the following formula:

$$Fpc = K \cdot N^2 \cdot (Ro^2 - Ri^2)^2 \quad (K: \text{constant})$$

On the other hand, the centrifugal oil pressure is also generated in the centrifugal oil pressure correction chamber C3. The centrifugal oil pressure is acted on the opposite direction of the oil pressure chamber C2. The centrifugal oil pressure acting on the main and sub cylinders 33 and 31 is represented by the following formula:

$$Fpc' = K \cdot N^2 \cdot [(Ro^2 - R1^2)^2 - (R2^2 - R1^2)^2]$$

R1: the radius between the small opening h2 and the center of the shaft 25, R2: the outer radius of the sub-cylinder 31)

Accordingly, the centrifugal oil pressure acting on the movable sheave 24B is represented by the following formula:

$$Fpc - Fpc' = K \cdot N^2 \cdot [[(Ro^2 - Ri^2)^2 - [(Ro^2 - R1^2)^2 31 (R2^2 - R1^2)^2]]$$

In this formula, assuming that $[(Ro^2 - Ri^2)^2 - [(Ro^2 - R1^2)^2 - (R2^2 - R1^2)^2]]$ is set so as to become as small as possible, the centrifugal oil pressure against the depression force F acting on the movable sheave 24B is reduced. For instance, if R1 is equal to Ri and R2 is approximately equal to R1, $$Fpc - Fpc' = K \cdot N^2 \cdot (R2^2 - R1^2)^2 \approx 0$$

Consequently, the centrifugal oil pressure against the depression force F acting on the movable sheave 24B almost becomes naught as the difference between R1 and R2 approaches zero, and/or as N. Namely, the small opening h2 is located to be equal to the inner radius of the movable sheave 24B or to become smaller than that.

Figure 3:
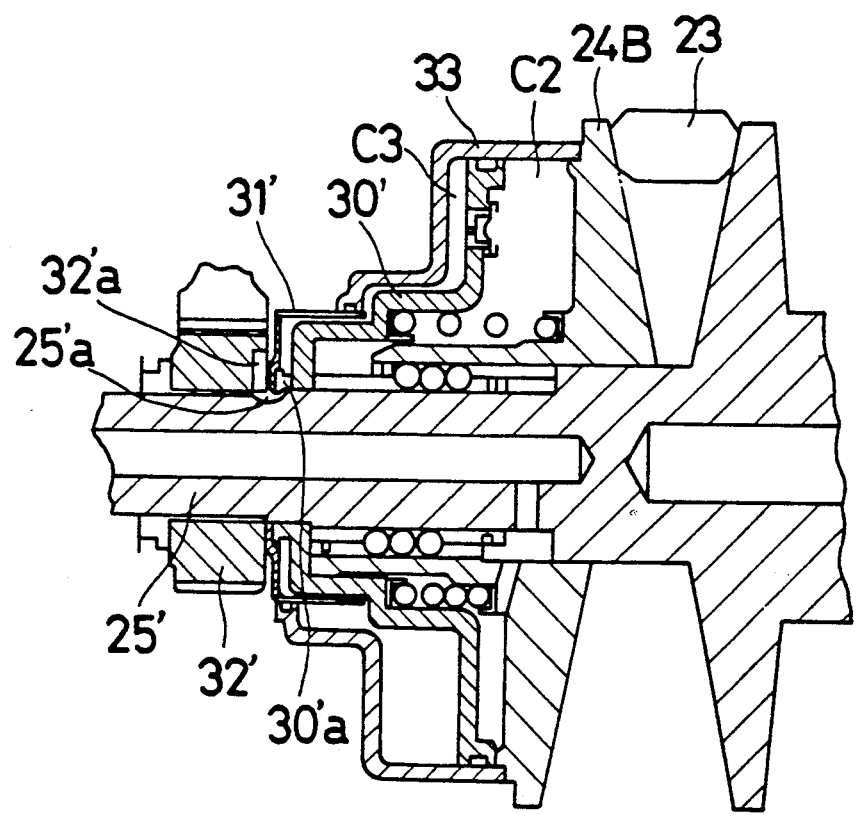
FIG. 3 shows a partially cross sectional view illustrated an another embodiment of the invention.
Figure 4:
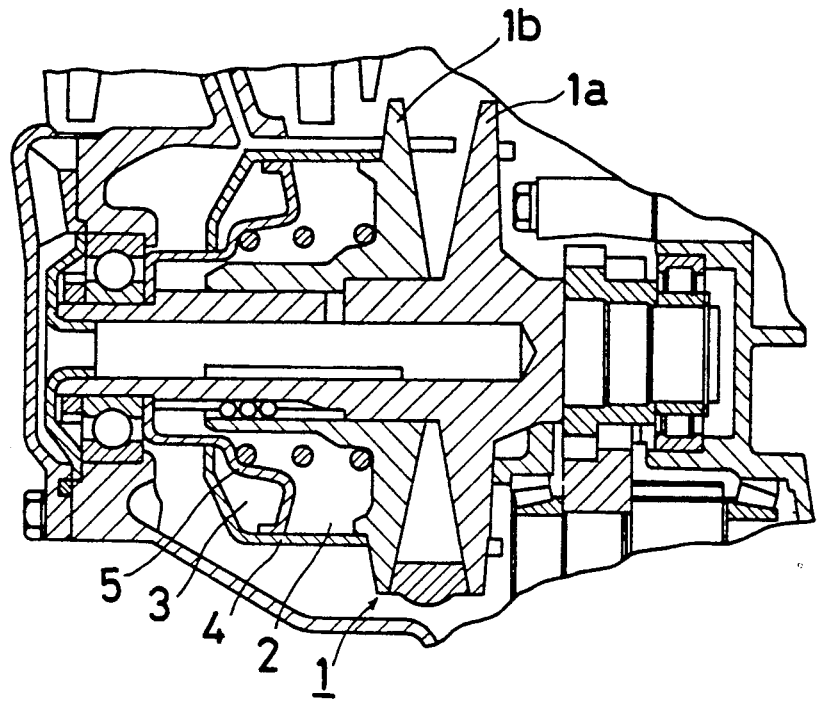
FIG. 4 shows a centrifugal oil pressure control device for continuously variable transmission of the Related Art.
Figure 5:
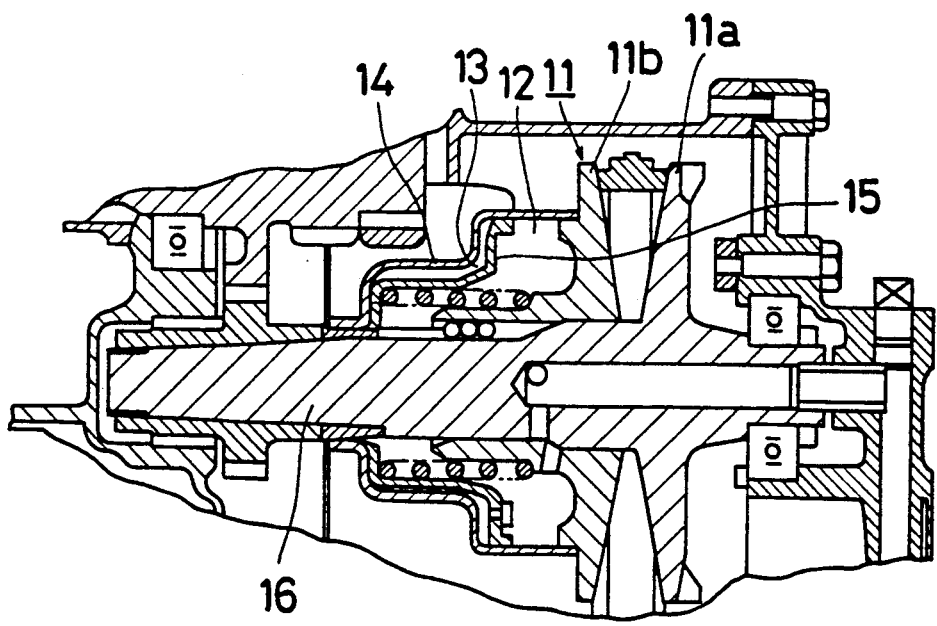
FIG. 5 shows a centrifugal oil pressure control device for continuously variable transmission of the Related Art.

FIG. 3 shows another embodiment of the invention. A semicircular shaped groove 25'a is formed on the output shaft 25' fixedly connected to one end of a sub-cylinder 31'. A cut portion 30'a is formed on the piston 30' so as to communicate with the semicircular shaped groove 25'a. Moreover, a cut portion 32'a is formed on the output gear 32' so as to communicate with the semicircular shaped groove 25'a. Thereby, the oil pressure transmitted into the oil pressure correction chamber C3 is released via the semicircular shaped groove 25'a and cut portions 30'a and 32'a. In this case, the position of the semicircular shaped groove 25'a is more radially and inwardly located than the inner radius of the movable sheave 24B. Thus, the centrifugal oil pressure against the depression F acted on the movable sheave 24B almost becomes naught by the above mentioned formulas.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A centrifugal oil pressure control device for a continuously variable transmission, comprising:
   a shaft;
   a first sheave fixedly connected to said shaft;
   a second sheave slidably connected to said shaft and rotatable together therewith;
   a power transmitting member held by said first and said second sheaves;
   an oil pressure chamber connected to said second sheave;
   a centrifugal oil pressure correction chamber connected to an opposite side of said oil pressure chamber with respect to said second sheave;
   a sub-cylinder fixedly connected to said shaft;
   a main cylinder fixedly connected to said second sheave and slidably movable on said sub-cylinder;
   a piston fixedly connected to said shaft and slidably connected to the inner surface of said main cylinder and defining said oil pressure chamber and said centrifugal oil pressure correction chamber thereby; and
   a first opening formed in said piston, said oil pressure chamber communicating with said centrifugal oil pressure correction chamber by said first opening, said sub-cylinder having a second opening communicated between said centrifugal oil pressure correction chamber and a transmission casing, said second opening being radially positioned to equal to or slightly less than the inner radius of said second sheave.

2. A centrifugal oil Pressure control device for a continuously variable transmission according to claim 1, wherein said centrifugal oil pressure control means includes said sub-cylinder having an inner end portion fixedly fitted to said piston and a gear provided on said shaft, a wall portion having a clearance between said gear and said inner end portion and an outer portion slidably connected to said piston, said second opening formed on said wall portion.

3. A centrifugal oil pressure control device for a continuously variable transmission according to claim 1, wherein said centrifugal oil pressure control means includes said sub-cylinder having a first cut portion, said shaft having a groove, a gear having a second cut portion, and said first and second cut portions and said groove are communicated with each other.

4. A centrifugal oil pressure control device for a continuously variable transmission according to claim 2, wherein the size of said first opening is smaller than that of said second opening.

5. A centrifugal oil pressure control device for a continuously variable transmission according to claim 3, wherein the size of said first opening is smaller than that of said second opening.

* * * * *